United States Patent [19]
Tsai et al.

[11] Patent Number: 5,922,091
[45] Date of Patent: Jul. 13, 1999

[54] CHEMICAL MECHANICAL POLISHING SLURRY FOR METALLIC THIN FILM

[75] Inventors: Ming-Shih Tsai; Wei-Tsu Tseng, both of Hsinchu, Taiwan

[73] Assignee: National Science Council of Republic of China, Taipei, Taiwan

[21] Appl. No.: 08/857,846

[22] Filed: May 16, 1997

[51] Int. Cl.⁶ ........................................................ B24D 3/34
[52] U.S. Cl. ................................ 51/306; 51/309; 252/79.1
[58] Field of Search ..................... 51/306, 309; 438/692; 252/79.1

[56] References Cited

U.S. PATENT DOCUMENTS

| | | | |
|---|---|---|---|
| 5,209,816 | 5/1993 | Yu et al. | 156/636 |
| 5,389,194 | 2/1995 | Rostoker et al. | 252/79.3 |
| 5,391,258 | 2/1995 | Brancaleoni et al. | 156/636 |
| 5,476,606 | 12/1995 | Brancaleoni et al. | 252/79.1 |
| 5,756,398 | 5/1998 | Wang et al. | 438/692 |
| 5,800,577 | 9/1998 | Kido | 51/309 |

*Primary Examiner*—Deborah Jones
*Attorney, Agent, or Firm*—Bacon & Thomas, PLLC

[57] ABSTRACT

This invention provides metallic thin film chemical mechanical polishing slurry compositions having improved suspension stability. The slurry contains 2.5–10% by weight of alumina powder and 2–20% by volume of phosphoric acid (80% concentration ) solution, and using potassium hydroxide to adjust its pH to 1–6 so as to increase suspension ability of the alumina powder in the aqueous slurry. The polishing slurry compositions can further combine with suitable oxidizers such as hydrogen peroxide, ferric nitrate and so on to be appropriately used for chemical mechanical polishing metallic thin film in the process of manufacturing semiconductor in order to control abrasion rate and unevenness more easily.

14 Claims, 1 Drawing Sheet

CHEMICAL MECHANICAL POLISHING SLURRY FOR METALLIC THIN FILM

BACKGROUND OF THE INVENTION

1. Field of the Invention

The invention relates to novel polishing slurry compositions for chemical mechanical and polishing metallic thin films, and particularly, to improved polishing slurry compositions with increased suspension stability of solid abrasives for chemical mechanical polishing metallic thin films and to the use of such polishing slurry formulations in chemical mechanical polishing of metallic thin films, especially metallic thin films deposited on semiconductor substrates.

2. Description of the Prior Art

In an multiple in-line manufacture process of ultra integrated circuits, a dielectric outer layer having a fluctuated surface is generally formed due to surface fluctuation of the metal on the surface of the chip, thereby influencing the precision and resolution of image transfer. A flattened dielectric layer is favored for subsequent in-line manufacturing of the metal and thus a more precise conductor pattern is transferred. Heretofore, only chemical mechanical polishing can provide wholly flattening of the dielectric layer. U.S. Pat. No. 5,209,816 to C. Y. Yu et al. discloses slurry compositions comprising hydrogen peroxide, water, phosphoric acid and solid abrasives, which, in a mixed chemical and mechanical manner, oxidizes surface metallic aluminum with hydrogen peroxide to form an aluminum oxide layer, and meanwhile, mechanical polishing and phosphoric acid etching the aluminum oxide layer. A continuous agitation must be maintained in the polishing process using this slurry compositions. However, it still can not prevent settling of alumina power and/or unstable distribution uniformity, thereby resulting in easily scratching and damage of the chips to be polished.

SUMMARY OF THE INVENTION

As described above, there are disadvantages in conventional metal polishing compositions. In view of this, the inventor has studied intensively for a long time and as the result, provides chemical mechanical polishing slurry compositions for metallic thin films which are suitable for chemical mechanical polishing of various metallic thin films.

Accordingly, an object of the invention is to provide novel chemical mechanical polishing slurry compositions suitable for various metallic thin films, characterized in having increased suspension stability of the solid abrasives contained therein.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
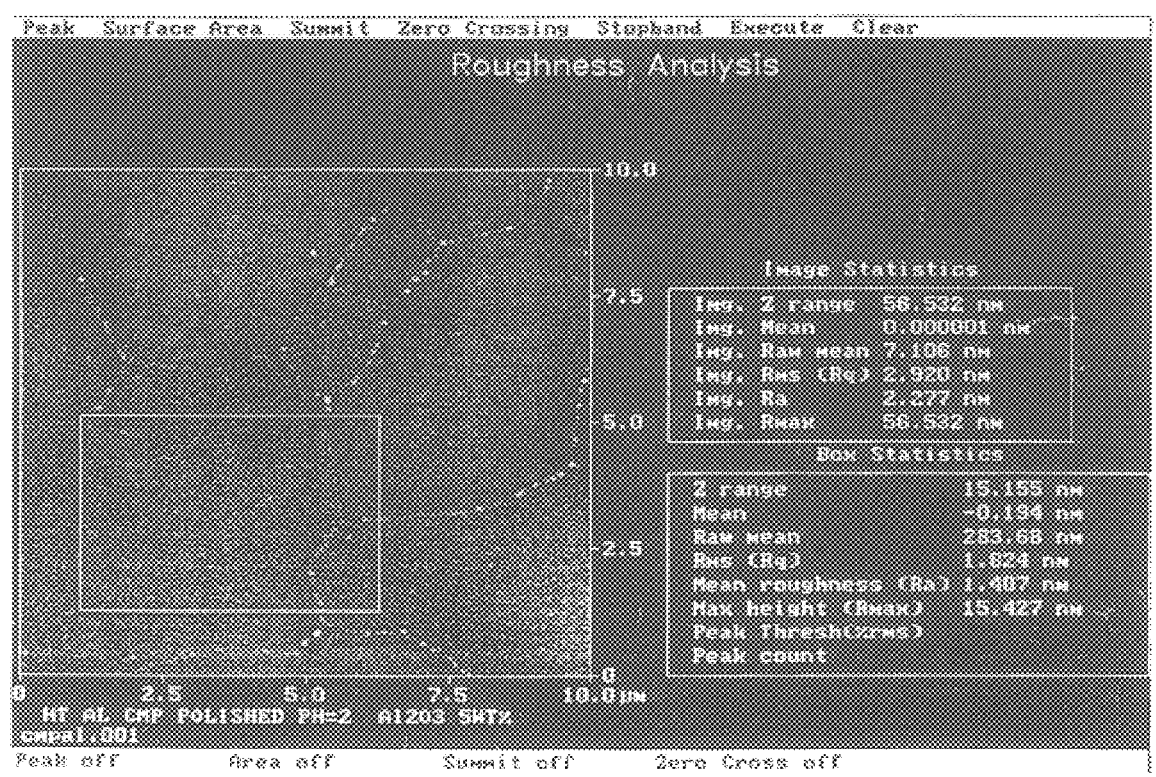
FIG. 1 shows the roughness analysis of A-3 in example A according to the invention.

The novel polishing slurry compositions according to the invention comprise an acidic slurry composition containing acid, base, and solid abrasives, associated with a suitable oxidizer, customary additives and water. Suitable acids include protic acids, such as phosphoric acid, tartaric acid, acetic acid and so on. Suitable bases may be hydroxides of formula $M(OH)_n$ where M represents an alkali or alkaline earth metal, and n is 1 or 2. Suitable solid abrasives comprise, for example, alumina and so on. Suitable oxidizers comprise, for example, hydrogen peroxide, ferric nitrate and so on.

The polishing mechanism of the polishing slurry compositions according to the invention consists of forming electric double layer surface charges on the surface of the solid abrasives by anions from the dissociation of protic acids in the polishing slurry and $M^{n+}$ cations from the hydroxides $M(OH)_n$ so as to stabilize the suspension of the abrasives in the aqueous slurry and thereby prevent scratching damage on the surface of the chips by the abrasives such that no scratches will be formed. Furthermore, a complex can be formed between the protic acid and $M^{n+}$ so as to contribute to the promotion of the abrasion rate. The process using the polishing slurry compositions according to the invention is different from that of C. Y. Yu et al. which involves oxidation of surface aluminum on the chip. The oxidizers in the novel slurry compositions according to the invention can be used selectively and this feature of the invention is considerably different from the above-mentioned U.S. Pat. No. 5,209,816.

The following data shows the composition used in Example A of the invention, wherein the metallic thin film is an Al—Si—Cu alloy thin film having a thickness of $9 \times 10^3$ $A^\circ$ and factor $\rho$ of 2.96 $\mu$ Ω-cm. The pH value* is the pH of 10 vol % solution of phosphoric acid (80% concentration) after adjusting with KOH to the desired value.

| Example A | Composition of polishing $Al_2O_3:H_2O_2$ | pH value* | Abrasion rate $A^\circ$/min | unevenness % |
|---|---|---|---|---|
| A-1 | 5    2.5 | 2 | 2529 | 2.7 |
| A-2 | 5    2.5 | 2 | 3025 | 0.7 |
| A-3 | 5    7.5 | 2 | 3184 | 0.9 |
| A-4 | 5    7.5 | 2 | 3127 | 1.01 |
| A-5 | 2.5  0   | 2 | 2173 | 1.4 |
| A-6 | 2.5  0   | 2 | 2038 | 0.9 |
| A-7 | 2.5  5   | 2 | 2439 | 0.7 |
| A-8 | 2.5  5   | 2 | 2563 | 1.08 |

In the polishing process of this example, the unevenness is extremely low and a gloss mirror surface having no scratches formed after polishing. Please refer to FIG. 1. FIG. 1 shows roughness analysis of A-1 in example A according to invention.

The following data shows the composition used in Example B of the invention, wherein the metallic thin film is an Al—Si alloy thin film having a thickness of $1.1 \times 10^3 A^\circ$ and factor $\rho$ of 2.58 $\mu$ Ω-cm. The pH value* is the pH of a 10 vol % solution of phosphoric acid (80% concentration) after adjusting with KOH to the desired value.

| Example B | Composition of polishing $Al_2O_3:H_2O_2$ | pH value* | Abrasion rate $A^\circ$/min | unevenness % |
|---|---|---|---|---|
| B-1 | 5    2.5 | 2 | 2128 | 1.4 |
| B-2 | 5    2.5 | 2 | 1845 | 2.3 |
| B-3 | 5    7.5 | 2 | 1893 | 2.1 |
| B-4 | 5    7.5 | 2 | 1807 | 1.9 |
| B-5 | 2.5  0   | 2 | 1635 | 1.4 |
| B-6 | 2.5  0   | 2 | 1561 | 1.8 |
| B-7 | 2.5  5   | 2 | 1501 | 1.5 |
| B-8 | 2.5  5   | 2 | 1920 | 1.5 |

In the polishing process, the unevenness is extremely low and a gloss mirror surface having no scratches formed after polishing.

The following data shows the composition used in Example C of the invention, wherein the metallic thin film is an Al—Cu alloy thin film having a thickness of $10 \times 10^3$ A$^0$ and factor $\rho$ of 2.58 $\mu\Omega$-cm. The pH value* is the pH of a 10 vol % solution of phosphoric acid (80% concentration) after adjusting with KOH to the desired value.

| Example C | Composition of polishing | | Abrasion rate | unevenness |
|---|---|---|---|---|
| | $Al_2O_3$:$H_2O_2$ | pH value* | A°/min | % |
| C-1 | 5 | 2.5 | 2 | 1887 | 1 |
| C-2 | 5 | 2.5 | 2 | 1810 | 2 |
| C-3 | 5 | 7.5 | 2 | 1887 | 2.1 |
| C-4 | 5 | 7.5 | 2 | 1916 | 2.2 |
| C-5 | 2.5 | 0 | 2 | 1455 | 0.4 |
| C-6 | 2.5 | 0 | 2 | 1465 | 0.4 |
| C-7 | 2.5 | 5 | 2 | 1897 | 0.4 |
| C-8 | 2.5 | 5 | 2 | 1929 | 0.6 |

In the polishing process, the unevenness is extremely low and a gloss mirror surface having no scratches formed after polishing.

The following data shows the results obtained after using the polishing slurry compositions according to the invention on various metallic thin films. The polishing process parameters used are as follows:

polishing machine: Westech 372M; abrasion pressure: 7 psi; rotation rate of table: 20 rpm; rotation rate of supporting head: 42 rpm. composition of the polishing slurry: 5 wt. % of $Al_2O_3$; 0% $H_2O_2$; pH=2.5. pH value: pH of a 10 vol % solution of hosphoric acid (80% concentration) after adjusted by KOH to a desired value.

| Example | Film Substrate | Abrasion rate (A°/mm) | Selectroity (vs. Ti) | Selectroity (vs. hot silica film) |
|---|---|---|---|---|
| B-1 | Al-1%Si-0.5%Cu | 1015.58 | 1.61 | 19.38 |
| B-2 | Al-1%Si | 758.10 | 1.20 | 14.47 |
| B-3 | Al-0.5%Cu | 743.82 | 1.18 | 14.20 |
| B-4 | pure Al | 1002.06 | 1.58 | 19.12 |
| B-5 | pure Ti | 632.14 | — | — |
| B-6 | hot silica film | 52.14 | — | — |

Many changes and modification in the above-desired embodiments of the invention can, of course, be carried out without departing from the scope thereof. Accordingly, to promote the progress in science and the useful arts, the invention is disclosed and is intended to be limited only by the scope of the appended claims.

What is claimed is:

1. A metallic thin film chemical mechanical polishing slurry composition comprising 2.5–10% by weight of solid abrasives; a protic acid in an amount effective to stabilize the suspension of the abrasives in the slurry; and a hydroxide of formula M(OH)$_n$, wherein, M represents an alkali or alkaline earth metal and n is 1 or 2; said slurry having a pH of from 1–6.

2. A metallic thin film chemical mechanical polishing slurry composition as claimed in claim 1, wherein said protic acid is phosphoric acid, tartaric acid, acetic acid or combinations thereof.

3. A metallic thin film chemical mechanical polishing slurry composition comprising 2.5–10% by weight of solid abrasives; a protic acid in an amount effective to stabilize the suspension of the abrasives in the slurry; a hydroxide of formula M(OH)$_n$; and an oxidizer; wherein, M represents an alkali or alkaline earth metal and n is 1 or 2; said slurry having a pH of from 1–6.

4. A metallic thin film chemical mechanical polishing slurry composition of claim 3, wherein said protic acid is phosphoric acid, tartaric acid, acetic acid or combinations thereof.

5. A metallic thin film chemical mechanical polishing slurry composition of claim 1, wherein said solid abrasive is alumina.

6. A metallic thin film chemical mechanical polishing slurry composition of claim 2, wherein said solid abrasive is alumina.

7. A metallic thin film chemical mechanical polishing slurry composition of claim 3, wherein said solid abrasive is alumina.

8. A metallic thin film chemical mechanical polishing slurry composition of claim 4, wherein said solid abrasive is alumina.

9. A metallic thin film chemical mechanical polishing slurry composition of claim 3, wherein said oxidizer is hydrogen peroxide, ferric nitrate or combinations thereof.

10. A metallic thin film chemical mechanical polishing slurry composition of claim 4, wherein said oxidizer is hydrogen peroxide, ferric nitrate or combinations thereof.

11. A metallic thin film chemical mechanical polishing slurry composition of claim 7, wherein said oxidizer is hydrogen peroxide, ferric nitrate or combinations thereof.

12. A metallic thin film chemical mechanical polishing slurry composition of claim 8, wherein said oxidizer is hydrogen peroxide, ferric nitrate or combinations thereof.

13. A process for stabilizing suspension uniformity of a suspension of solid abrasives, which comprises mixing 2.5–10% by weight of solid abrasives; sufficient amounts of a protic acid; and a hydroxide of formula M(OH)$_n$, wherein, M represents an alkali or alkaline-earth metal, and n is 1 or 2, and to form a stabilized slurry having a pH of from 1–6.

14. A process for stabilizing suspension uniformity of a suspension of solid abrasives of claim 13, wherein said protic acid is phosphoric acid, tartaric acid, acetic acid or combinations thereof.

* * * * *